(12) United States Patent
Matsuda et al.

(10) Patent No.: US 6,223,729 B1
(45) Date of Patent: May 1, 2001

(54) CONTROLLING APPARATUS FOR ENGINE FOR MODEL AND CONTROLLING METHOD THEREFOR

(75) Inventors: Norio Matsuda; Michio Yamamoto; Kazuyuki Tanaka, all of Mobara (JP)

(73) Assignee: Futaba Denshi Kogyo Kabushiki Kaisha, Mobara (JP)

( * ) Notice: Subject to any disclaimer, the term of this patent is extended or adjusted under 35 U.S.C. 154(b) by 0 days.

(21) Appl. No.: 09/311,061

(22) Filed: May 13, 1999

(30) Foreign Application Priority Data

May 15, 1998 (JP) .................................................. 10-133505

(51) Int. Cl.$^7$ .............................. F02D 41/34; F02B 75/34
(52) U.S. Cl. ..................... 123/478; 123/1 A; 123/DIG. 3
(58) Field of Search ..................................... 123/478, 480, 123/DIG. 3, DIG. 5, 531, 533, 1 A

(56) References Cited

U.S. PATENT DOCUMENTS

| | | | | |
|---|---|---|---|---|
| 4,196,702 | * | 4/1980 | Bowler | 123/493 |
| 5,012,780 | * | 5/1991 | Bugamelli | 123/478 |
| 5,829,415 | * | 11/1998 | Matsuda | 123/531 |
| 5,832,882 | * | 11/1998 | Matsuda | 123/73 R |
| 5,975,055 | * | 11/1999 | Matsuda et al. | 123/472 |

FOREIGN PATENT DOCUMENTS

| | | | |
|---|---|---|---|
| 11-324702 | * | 11/1999 | (JP) . |
| 19921020 | * | 11/1999 | (DE) . |

* cited by examiner

Primary Examiner—Tony M. Argenbright
Assistant Examiner—Hieu T. Vo
(74) Attorney, Agent, or Firm—Oblon, Spivak, McClelland, Maier & Neustadt, P.C.

(57) ABSTRACT

A method and apparatus for controlling an engine for models include setting an injection period for fuel in accordance with an amount of fuel per cycle required for operating of the engine; judging whether the injection period is below a minimum injection period controllable in a fuel injection apparatus of the engine, selecting an intermittent injection data corresponding to the injection period when the injection period is below the minimum injection period; and intermittently injecting fuel into the fuel injection apparatus for a controllable injection period at an injection timing based on the selected intermittent injection data.

12 Claims, 6 Drawing Sheets

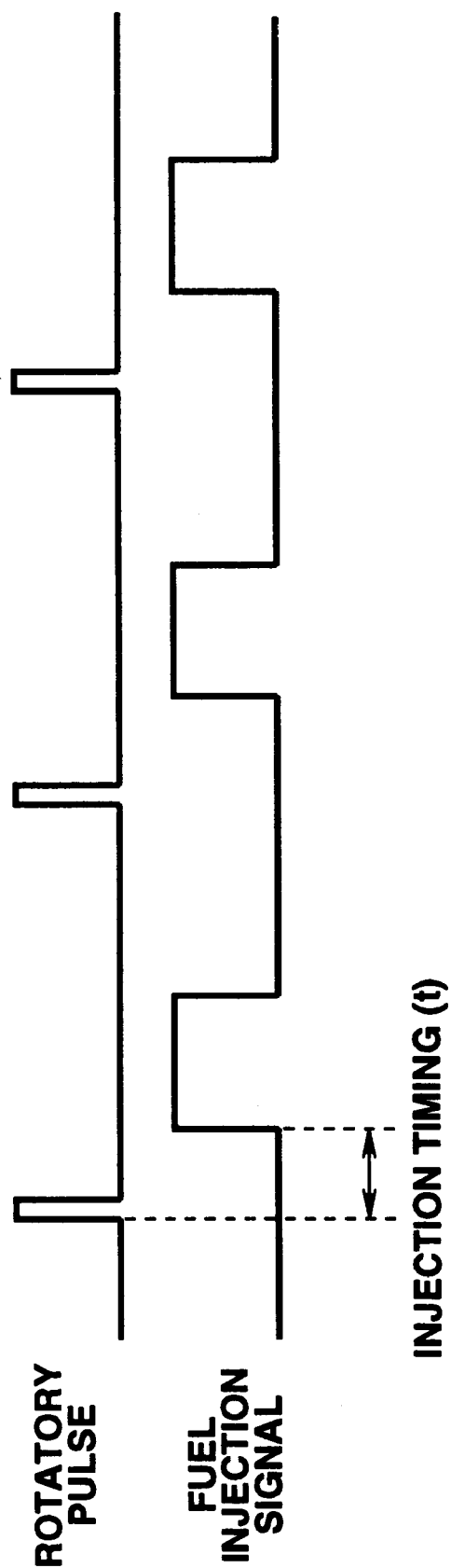

CONTROLLING APPARATUS FOR ENGINE FOR MODEL AND CONTROLLING METHOD THEREFOR

BACKGROUND OF THE INVENTION

1. Field of the Invention

This invention relates to an engine for a model equipped with a fuel injection apparatus and method therefor, and more particularly an engine for a model which is able to throttle fuel sufficiently at the time of low speed revolution to secure the stability of operation and a method therefor.

2. Description of the Prior Art

A carburettor has been conventionally used in a two-stroke cycle or four-stroke cycle globe engine as a means for regulating quantity of fuel supplied to a combustion chamber of the engine.

The present applicant has proposed an engine for a model equipped with a fuel injection apparatus instead of the carburettor. In this engine, air pressure generated in a crankcase is introduced into a combustion tank through a check valve and stored in the tank and fuel is pressurized to 20–100 kPa.

The pressure generated in the crankcase of the engine varies depending on number of revolutions, that is to say, it is high at the time of high speed revolution, and it is low at the time of low speed revolution. Therefore, the aforementioned fuel tank is constructed so that the maximum pressure can be stored therein. It is, however, difficult in practice to maintain stably a constant pressure, for example, at 30–40 kPa.

Therefore, a regulator has been conventionally used in order to control constantly the pressure of fuel supplied from the fuel tank to feed to a fuel injection apparatus. The regulator is an apparatus for passing only the fuel having a certain given pressure.

FIG. 5 is a block diagram of a fuel injection apparatus of a conventional engine for a model and FIG. 6 is a view of timing for the same. A rotatory pulse is generated by a rotatory pulse detecting apparatus mounted to, for example, a crankshaft of an engine. This rotatory pulse is inputted into an injection timing generating circuit 100. The injection timing generating circuit 100 outputs a timing signal which is delayed by time interval t with respect to the rotatory pulse into a fuel injection signal generating circuit 101. An injection period signal proportional to open of a carburettor is inputted into a fuel period generating circuit 102. The fuel period generating circuit 102 generates an actual injection period signal which is inputted into the fuel injection signal generating circuit 101. The fuel injection signal generating circuit 101 generates a fuel injection signal as shown in FIG. 6 which is given to a fuel injection apparatus driving circuit 103. The fuel injection apparatus driving circuit 103 drives a fuel injection apparatus 104 on the basis of the signal.

In a conventional engine of a model which pressurizes the fuel by air pressure in a crankcase and injects the fuel by a fuel injection apparatus, it is premised that the pressure of the fuel is constant, and the supply of the fuel is controlled by injection period. That is to say, when the number of revolutions is low, the injection period is shortened to decrease the quantity of the fuel, and when the number of revolutions is high, the injection period is lengthened to increase the quantity of the fuel.

At the time of low speed, however, the pressure of the fuel rises since the quantity of the fuel used is small, and the fuel becomes dense. And, since the quantity of the fuel used per unit time is large at the time of high speed, the supply of the fuel is not sufficient, and the fuel becomes thin. Therefore, in the conventional engine for a model, the revolution of the engine is unstable and there is possibility in some instances that overheat takes place at the time of high speed and engine stop takes place at the time of low speed.

SUMMARY OF THE INVENTION

An object of this invention is to provide an engine for a model which is able to throttle fuel sufficiently at the time of low speed revolution to secure the stability of operation and a method for controlling an engine for a model.

According to a first aspect of this invention, there is provided a method of controlling an engine for a model characterized in that, in the method of controlling the engine for the model equipped with a fuel injection apparatus (50), when an amount of fuel per one cycle required for driving the engine is amount corresponding to an injection period falling below the minimum injection period controllable in the aforesaid fuel injection apparatus, according to corresponding relationship between a predetermined injection period and intermittent injection data (for example, an intermittent injection data table 65), the aforesaid intermittent injection data is determined corresponding to the aforesaid injection period, and the fuel is intermittently injected into the aforesaid fuel injection apparatus for a controllable period for injection on the basis of the intermittent injection data.

According to a second aspect of this invention, there is provided a method of controlling an engine for a model characterized in that, in the method of controlling the engine (1) for the model equipped with a fuel injection apparatus (50), said method is characterized by comprising a first step of generating a fuel injection period corresponding to an amount of fuel per one cycle required for driving an engine, a second step of judging whether or not the aforesaid injection period falls below the controllable minimum injection period in the aforesaid fuel injection apparatus, a third step of, when a judgement is brought to be below at the second step, according to a corresponding relationship between a predetermined injection period and intermittent injection data (for example, an intermittent injection data table 65), determining the aforesaid intermittent injection data corresponding to the aforesaid injection period, and a fourth step of injecting fuel intermittently into the aforesaid fuel injection apparatus (50) for a controllable injection period depending on the timing making use of the selected intermittent injection data.

According to a third aspect of this invention, there is provided a method of controlling an engine (1) for a model characterized in that, in the method of controlling the engine for the model of the second aspect of this invention, when a judgement is brought not to be below at the aforesaid second step, fuel is injected into the aforesaid fuel injection apparatus (50) by one cycle for the aforesaid injection period.

According to a fourth aspect of this invention, there is provided a method of controlling an engine for a model characterized in that, in the method of controlling the engine for the model of the second aspect of this invention, the controllable injection period at the aforesaid fourth step is minimum injection period of the aforesaid fuel injection apparatus.

According to a fifth aspect of this invention, there is provided a method of controlling an engine for a model characterized in that, in the method of controlling the engine for the model of the second aspect of this invention, the intermittent injection data comprises bit data showing number of revolutions corresponding to one cycle of intermittent injection.

According to a sixth aspect of this invention, there is provided a controlling apparatus for an engine for a model (an electronic controlling element) characterized by comprising, in the controlling apparatus for the engine (1) for the model equipped with a fuel injection apparatus (50), an injection period generating means (60) for generating an injection period of fuel according to an amount required for driving the engine, an intermittent injection judging means (61) for judging whether or not the aforesaid injection period falls below the controllable minimum injection period in the aforesaid fuel injection apparatus, a data table (an intermittent injection data table 65) corresponding to the injection period and the intermittent injection data in the aforesaid fuel injection apparatus, an intermittent injection data selecting means (62) for selecting the aforesaid intermittent injection data corresponding to the aforesaid injection period on the basis of the aforesaid data table when a judgement is brought by the aforesaid intermittent injection judging means to be below, and a fuel injection signal generating means (64) for generating a fuel injection signal for injecting fuel intermittently into the aforesaid fuel injection apparatus for a controllable injection period depending on the injection timing making use of the selected intermittent injection data.

According to a seventh aspect of this invention, there is provided a controlling apparatus for an engine for a model characterized by comprising, in the controlling apparatus for the engine (1) for the model equipped with a fuel injection apparatus (50), an injection period generating means (60) for generating an injection period of fuel according to an amount required for driving the engine, an intermittent injection judging means (61) for judging whether or not the aforesaid injection period falls below the controllable minimum injection period in the aforesaid fuel injection apparatus, an intermittent injection data determine means which carries a relationship equation showing a corresponding relationship between the injection period in the aforesaid injection apparatus and an intermittent injection data and which determines the aforesaid intermittent injection data corresponding to the aforesaid injection period on the basis of the aforesaid relationship equation when a judgement is brought at the aforesaid intermittent injection judging circuit to be below, and a fuel injection signal generating means (64) for generating a fuel injection signal for injecting fuel intermittently into the aforesaid fuel injection apparatus for a controllable injection period depending on the injection timing making use of the aforesaid determined intermittent injection data.

BRIEF DESCRIPTION OF THE DRAWINGS

For a more complete understanding of this invention may be had to the following detailed explanations in connection with the accompanying drawings, in which

FIG. 6 is a timing chart for the fuel injection signal of a fuel injection apparatus of a conventional engine for a model.

DETAILED DESCRIPTION OF THE EMBODIMENT

The first example of working embodiments of this invention is described with reference to FIGS. 1–4. This example is relating to a two-stroke cycle engine for a model provided with an electronic control fuel injection apparatus. The engine 1 for the model is constructed so as to pressurize fuel by the use of air pressure generated in a crankcase when driving. And, the supply of the pressurized fuel can be regulated by the use of the aforementioned air pressure according to high and low of the number of revolutions of the engine and can be fed to the electronic control fuel injection apparatus.

Figure 1:
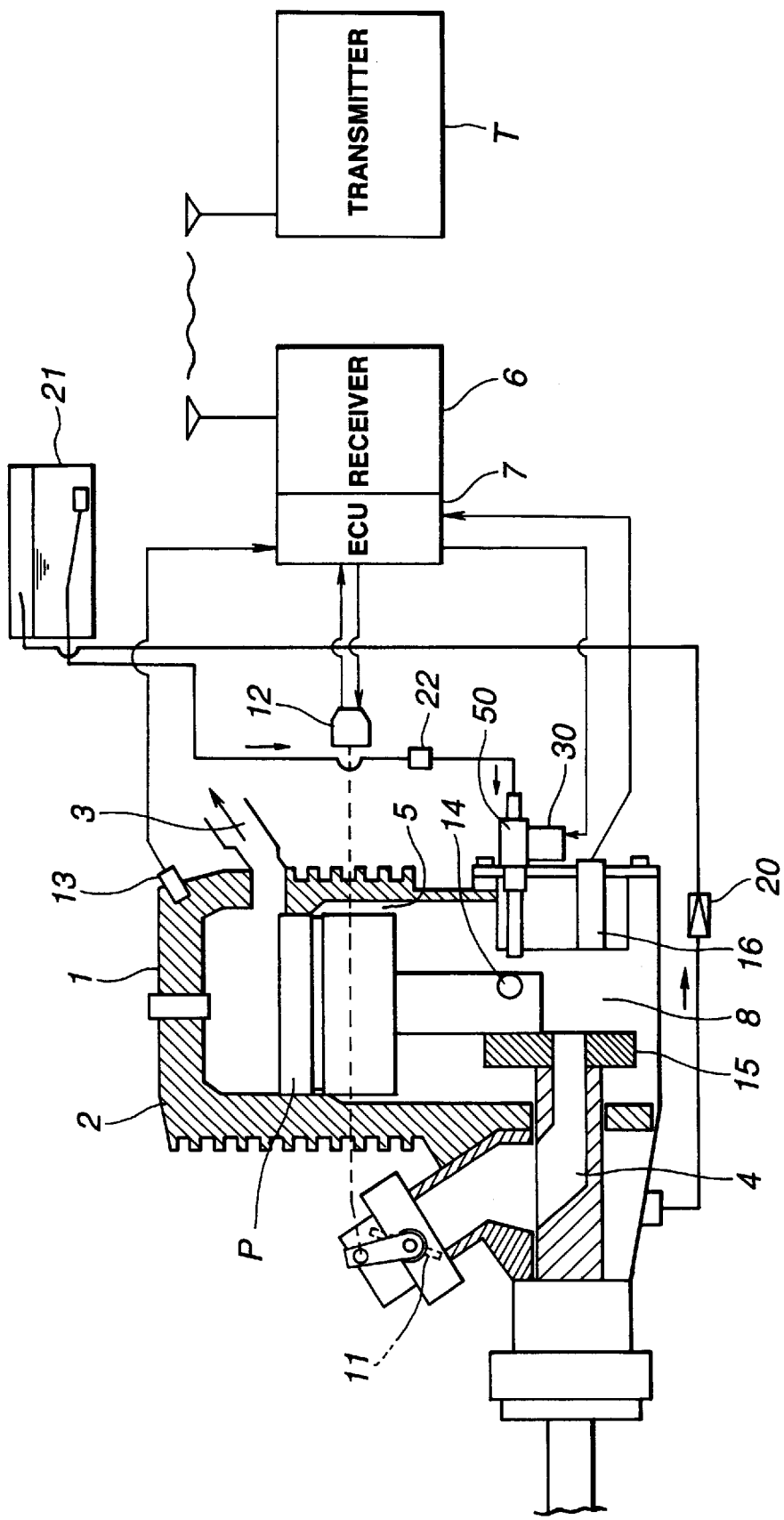
FIG. 1 is a schematic representation showing a whole structure of an engine of a model of a working embodiment of this invention.

As shown in FIG. 1, the two-stroke cycle engine is not provided with an inlet valve or an exhaust valve like a four-stroke cycle engine, and an exhaust port 3, an inlet port 4 and a scavenging port 5 are formed directly to a cylinder 2, which are opened by a piston P itself.

The engine 1 shown in FIG. 1 is started by a starter not shown in FIG. 1. The starter is driven by en electric power of a battery given through a rectifier or driven by supply of pressurized air supplied from a pressurizing means and the like.

The aforementioned engine is controlled by an electronic control part 7 of a receiver 6 mounted to a radio controlled model airplane. If an operator operates a transmitter T and the receiver 6 receives wave from the transmitter T to control each part including an engine.

A permanent magnet 14 is placed to a necessary position of a connecting rod. And, a revolution position sensor 16 as a stroke detecting means for detecting a position of a crank 15 which detects the aforesaid permanent magnet 14 to rotate is mounted to a prescribed position opposite to the permanent magnet 14. The revolution position sensor 16 detects the driving cycle of the engine 1 in order to determine the timing of injection of fuel. The rotatory pulse outputted from the revolution position sensor 16 is transmitted to the electronic control part 7 of the radio control receiver 6 and used to control the engine 1.

The air inlet port 4 of the engine 1 is equipped with a throttle valve 11 for adjusting the quantity of air to be introduced. The opening of the throttle valve 11 is controlled by means of a driving means 12 such as a throttle servo and the like. The driving means 12 is controlled by means of the electronic control part 7 of the radio control receiver 6. The cylinder 2 is equipped with a temperature sensor 13 the signal of which is inputted to the electronic control part 7 of the radio control receiver 6 to be used to control the engine 1.

As shown in FIG. 1, in this example, the air pressure generated in the crankcase 8 is introduced through the check valve 20 into the fuel tank 21 to apply predetermined pressure to the fuel in the fuel tank 21. This pressure is, in general, a maximum pressure of pulsation generated in the crankcase 8. The fuel tank 21 is closed structure. The pressurized fuel is introduced through a filter 22 to the fuel regulation apparatus 30 described later and then supplied to the electronic control fuel injection apparatus 10 placed in the crankcase 8.

The fuel regulation apparatus 30 is explained with reference to FIG. 2. A fuel inlet 32 is formed to one edge face of a cylinder-shaped main body 31. The fuel inlet 32 is connected with the fuel tank 21 through the filter 22. A fuel outlet 33 is formed to a side face of the main body 31 . The fuel inlet 32 and outlet 33 are connected each other through the passage 34 the cross section of which is nearly circle placed in the main body 31. A round bar-shaped regulating valve 35 (valving element) the diameter of which is somewhat smaller than that of the passage 34 is placed axially movably in the passage 34. An O-ring 36 as a sealing member is placed to one end of the regulating valve 35. A tapered seat face 37 is formed as a sealing position to the passage 34. When the regulating valve 35 moves and the O-ring 36 comes into contact with the seat face 37 with the prescribed force, the passage 34 is closed, and when the O-ring 36 is out of contact with the seat face 37, the passage 34 is opened. The first spring 38 is placed 2 between the inlet 32 and one end of the regulating valve 35. The first spring 38 is the first pushing means for pushing the regulating valve 35 in such a direction as to close the seat face.

The other end of the regulating valve 35 is in contact with a piston 39. The piston 39 is placed movably in a piston chamber 40 which is formed and opened at the other end of the main body 31. A packing 41 is placed between the piston 39 and the main body 31. An air inlet 42 as a regulated air supplying part is formed at the other end of main body 31.

The air inlet 42 is twisted in the opening of the piston chamber 40 by means of a screw 43, and the mounting position in axial direction relative to the main body 31 can be adjusted when rotating. That is to say, the screw member is a controlling mechanism for adjusting the position of the air inlet 42 to the main body 31 relative to a direction of reciprocating motion of the regulating valve 35. And, a second spring 44 is placed between the air inlet 42 and the piston 39 in the piston chamber 40. The spring 44 is the second pushing means for pushing the piston 39 in such a direction as to open the seat face 37 in the main body 31.

By virtue of the aforementioned controlling mechanism and the second spring 44, the position relative to the main body 31 can be adjusted by rotating the screw of the air inlet 42 and the second spring 44 can control through the piston 39 the force for pushing the regulating valve 35 in such a direction as to open. Thereby, a state of contact between the regulating valve 35 and the seat face 37 can be optionally regulated.

In the fuel regulating apparatus 30, the regulation valve 35 receives elastic force of the first spring 38 and fuel pressure per unit area. When the piston 39 is pressed by air pressure and elastic force of the second spring 44, the O-ring 36 of the regulating valve 35 is separated from the seat face 37 to make a space. The pressurized fuel goes to the fuel outlet 33 through the passage 34. The amount of fuel to be supplied is controlled so as to become an amount required for maintaining proper air/fuel ratio corresponding to the amount injected by the fuel injection apparatus 50, that is to say, number of revolutions of the engine.

Figure 2:
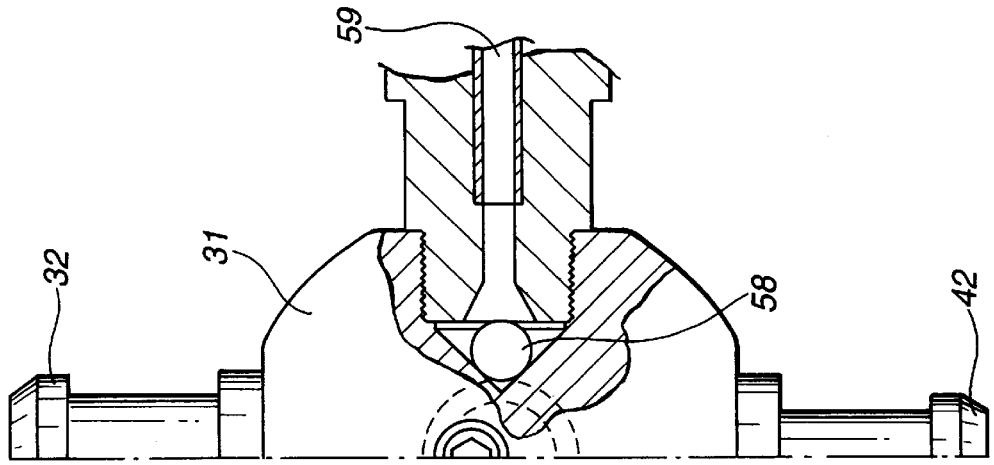
FIGS. 2a–b are cross sections of a fuel regulation apparatus of a working embodiment of this invention.
Figure 2:
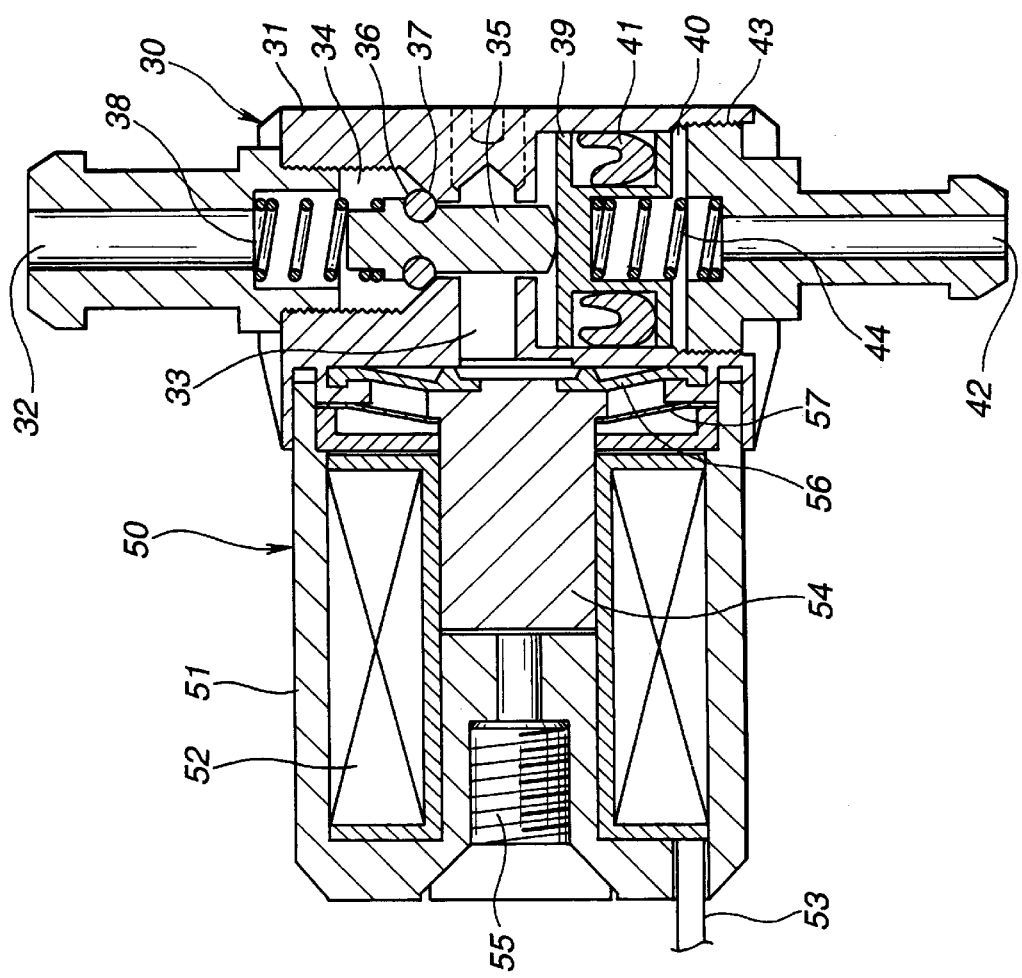

As shown in FIG. 2, the aforesaid fuel regulation apparatus 30 and the electronic control fuel injection apparatus 50 in one piece. The fuel injection apparatus 50 is equipped with a box 51. The box 51 is connected at its one end to the fuel outlet 33 of the main body 31 of the fuel regulation apparatus 30. An electromagnetic coil 52 is placed in the box 51. A feeder 53 connected to the electromagnetic coil 52 is pulled out of the box 51. A valving element 54 is placed in the electromagnetic coil 52. A core 55 is placed to the other end of the box 51. A diaphragm valve 56 of nearly circle is fixed to a head of the valving element 54, by circular projection of which diaphragm valve 56 the periphery of the fuel outlet 33 of the fuel regulation apparatus 30 is closed. A leaf spring 57 of nearly circle (pushing means) is placed to a head of the valving element 54, which pushes the valving element 54 toward the outlet 33 so that the diaphragm valve 56 closes the outlet 33.

As shown in FIG. 2 (b), an inside of the box 51 is connected through an injection hole 58 to an injection pipe 59.

Figure 3:
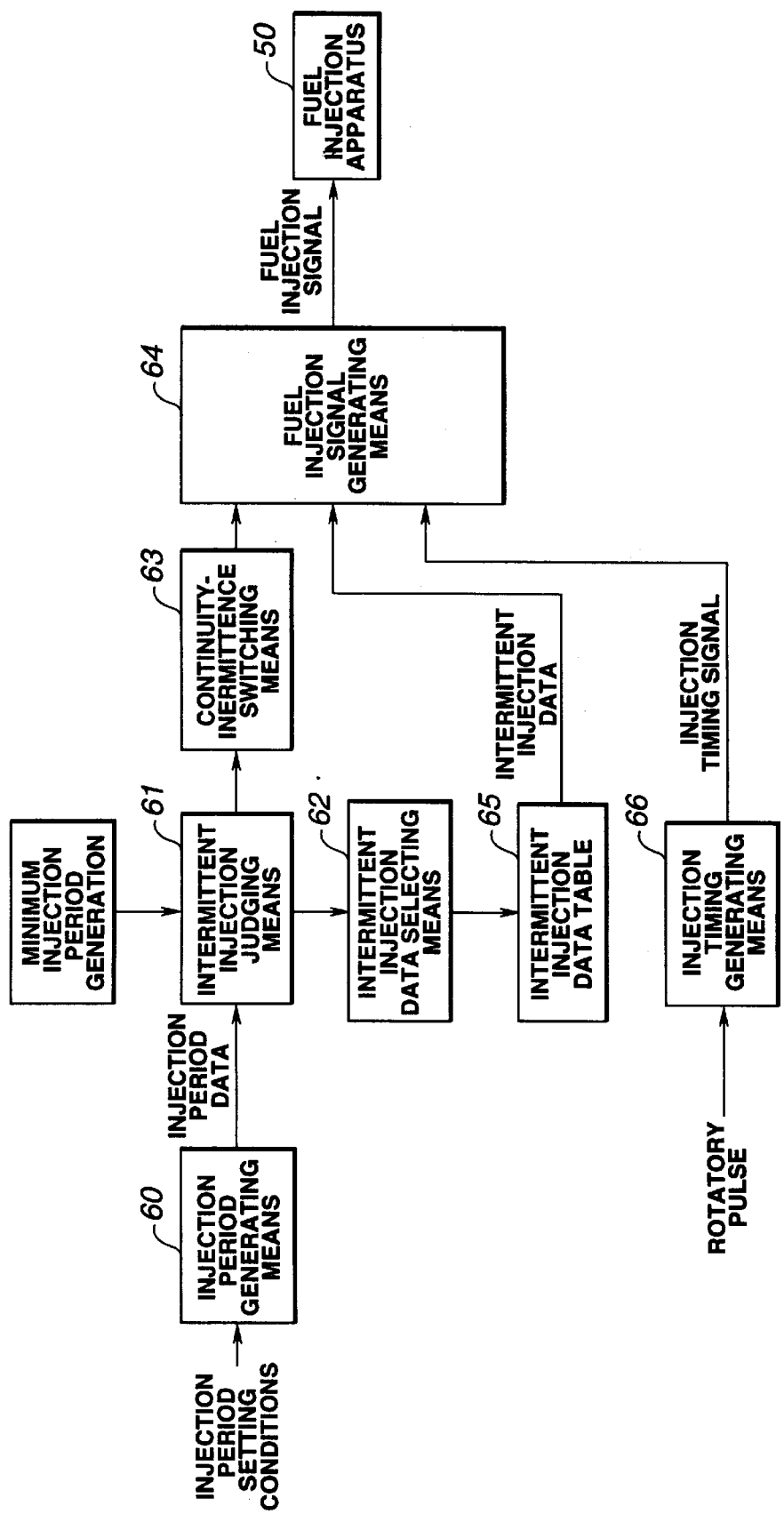
FIG. 3 is a block diagram of a controlling apparatus of a fuel injection apparatus of a working embodiment of this invention.

When a voltage is applied to the electromagnetic coil 52, the valving element 54 resists the pushing force of the leaf spring 57 to move to the left in FIG. 3 (b) the outlet 33 is connected to the inside of the box 51. The fuel the flow rate of which is determined according to the number of revolutions in the fuel regulation apparatus 30 is introduced through the outlet 33 into the box 51. And further, the fuel flows into an injection pipe 59 through the injection hole 58 to be injected into the crankcase 8.

In the fuel injection apparatus 50, the informations from the revolution position sensor 16 are processed by the electronic control apparatus and voltage is applied to the electromagnetic coil 52 during the period according to the injection amount required depending on the timing of inlet of the engine. By a magnetic field generated by the electromagnetic coil 52 to which a voltage has been applied, the valving element 54 adheres magnetically to the core 55. The diaphragm valve 56 which has been in a state of adhesion to the main body 31 is separated therefrom to form space and the fuel in the passage 34 flows into the box 51 and then injected into the crankcase 8 through the injection pipe 59 via the injection hole 58. Next, the control of the aforesaid electronic control fuel injection apparatus 50 (hereinafter referred to as a fuel injection apparatus or an injection apparatus) by the aforesaid electronic control part 7 is explained further more in detail with reference to FIGS. 3 and 4.

The amount of fuel per one cycle required for driving the engine is determined depending on opening of the throttle valve 11. The injection period generating means 60 generates injection period data per one cycle required for driving the engine depending on the value of the opening which is a condition for determining the injection period.

The injection period data is inputted to the intermittent injection judging means 61. The intermittent injection judging means 61 compares a controllable minimum injection period with the aforesaid injection period data by means of the fuel injection apparatus 50. The minimum injection period is a value which is determined by the fuel injection apparatus and is predetermined. In the case where the injection period data is smaller than the minimum injection period, the intermittent injection judging means 61 judges that the intermittent injection is necessary, and transmits an indicating signal to the intermittent injection data selecting means 62 to change to injection mode. And, the intermittent injection judging means 61 transmits a signal to the continuity intermittence switching means 63 to switch so that the fuel injection signal generating means 64 generates a signal in intermittent mode.

The apparatus of this invention carries the intermittent injection data table 65 (correspondence table) as one example of the corresponding relation between the predetermined injection period and the intermittent injection data. The intermittent injection data in the intermittent injection data table 65 corresponds to the injection period separated into plural steps, and are numerical data showing the number of injection in predetermined number of cycle. In the intermittent injection mode, the intermittent injection data selecting means 62 selects the intermittent injection data from the intermittent injection data table 66 (correspondence table).

For example, in the case where the minimum injection period is 1.3 ms, one injection per one cycle is carried out. In the case where the minimum injection period is 1.3 ms and above, the same is carried out. In the case where the minimum injection period is 1.3 and below, if the injection period is taken as being not less than 0.0325 ms nor more than 0.065 ms in the following equation;

(number of fuel injection $N/40) \times 1.3$=injection period $T$, and N=1, that is, one time of injection is carried out in 40 cycles. Similarly, when the injection period is taken as being not less than 0.065 ms nor more than 0.0975 ms in the above-described equation, and N=2, and when the injection period is taken as being not less than 1.235 ms nor more than 1.2675 ms in the above-described equation, and N=38, that is, 38 times of injection are carried out in 40 cycles. Provided that the above shall apply to the case where the injection period per one time is always taken as being 1.3 ms, minimum injection period within the intermittent injection.

The intermittent injection data comprise bit data corresponding to one cycle of the intermittent injection, for example, when it is 1, injection is ON, while it is 0, injection is OFF. When n revolution is one cycle (one time of injection), the number of bit is n. The injection data are counted by a ring counter, that is to say, as rotatory pulses are inputted, the data shift by one bit. When a bit at highest position is 1, the fuel injection is carried out for the minimum injection period $T_{min}$ of the injection apparatus, in contrast, when it is 0, the fuel injection is OFF. When selecting the intermittent injection data from the data table 65, if an actual injection period is taken as T, it is proper to select the Int $((T/T_{min})*n)$-th data. And, when T is small, while the rate of the intermittent injection lowers, the timing for injection ON is equalized so as to carry out uniformly fuel injection within one cycle of the intermittent injection.

Figure 4:
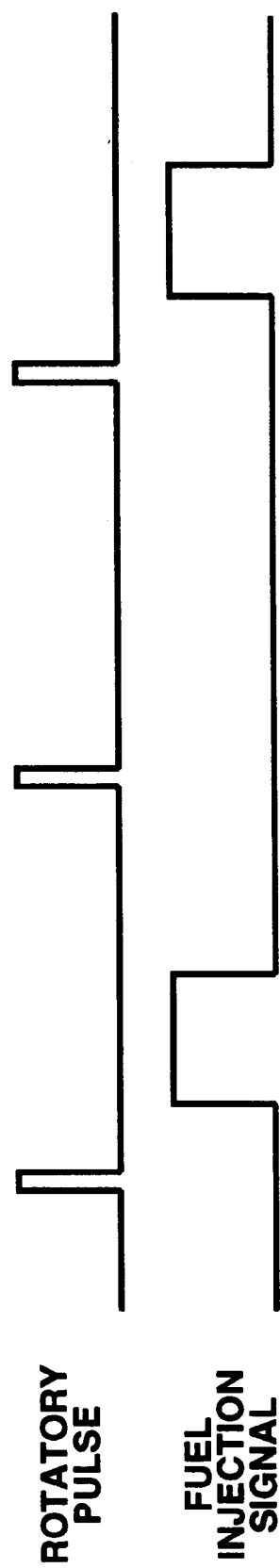
FIG. 4 is a timing chart showing fuel injection signal and so on when carrying out intermittent injection in a working embodiment of this invention.
Figure 5:
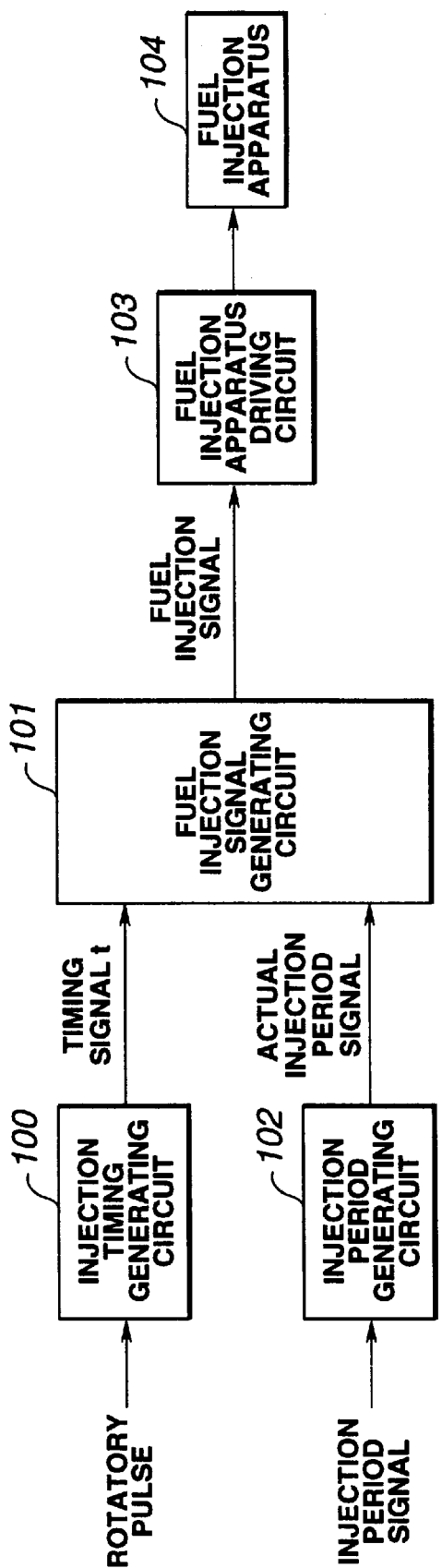
FIG. 5 is a block diagram of a controlling apparatus of a fuel injection apparatus of a conventional engine for a model.

The intermittent injection data are inputted into the fuel injection signal generating means 64. The injection timing generating means 66 generates an injection timing signal from rotatory pulses which is inputted into the fuel injection signal generating means 64. The fuel injection signal generating means 64 generates an intermittent fuel injection signal as shown in FIG. 4 which is transmitted to the fuel injection apparatus 50.

According to intermittent injection, an amount of injection which has been converted to amount per one cycle can be diminished than a minimum injection amount which is controllable, thereby stability of an engine at low speed revolution can be secured.

When the intermittent injection judging means 61 judges that the injection period data is longer than the minimum injection period, the intermittent injection judging means 61 carries out control in normal injection mode. That is to say, the intermittent injection judging means 61 transmits a signal to the continuity-intermittence switching means 63 to switch so that the fuel injection signal generating means 64 generates a signal in normal mode. The control is carried out so that fuel is injected every cycle according to injection period corresponding to the opening of the throttle 11.

The example of this invention carries the intermittent injection data table 65 (correspondence table) as an example of corresponding relation between the injection period and the intermittent injection data. It is not, however, objectionable to adopt relationship equation of both as the other example of corresponding relation between the injection period and the intermittent injection data. It is also not objectionable to perform an operation to determine the intermittent injection data on the basis of the inputted injection period and the relationship equation (calculated equation), whenever possible. For that purpose, when a judgement is brought that the injection period falls below the minimum value by the aforesaid intermittent injection judging circuit, the intermittent injection data determining means is installed for determining the intermittent injection data corresponding to injection period on the basis of the relationship equation carried in advance. And, the aforesaid intermittent injection data determined is transmitted to the fuel injection generating means to generate a fuel injection signal.

As explained above, according to the controlling apparatus for the engine of the model (electronic control part 7), the injection period per one cycle can be set at a value falling below the minimum injection period of the fuel injection apparatus 50 by driving the fuel injection apparatus 50 intermittently. Thereby, a fuel injection amount can be realized corresponding to zone of low speed revolution.

According to this example, since the fuel regulation apparatus 30 and the fuel injection apparatus 50 are integrated into one piece, the structure as a whole is compact and a pipe line system of fuel is simplified, and, therefore, this example is effective for the case where the space for mounting the apparatuses can not be taken sufficiently like an engine for a model.

A radio control model airplane to which the engine 1 for a model is mounted can perform frequently an acrobatic flight such as loop and the like which is infrequently carried out by an actual air plane practically used. Under such severe condition for flight, the injection of fuel in a fuel injection apparatus 50 is apt to be unstable. That is to say, the fuel in the fuel tank 21 or the fuel in a fuel supplying tube connecting the fuel tank 21 with the fuel injection apparatus 30 receives gravity and centrifugal force according to heavy flight operation of the model air plane, the magnitude and direction of which gravity and centrifugal force are changing continually. It is, therefore, difficult to maintain constantly the condition of injection of the fuel in the fuel injection apparatus 50, and it is anticipated that there is a case where fuel supply by injection becomes unstable in the engine mounted to the model air plane because of the influence of centrifugal force or gravity.

In the engine 1 for a model air plane of this example, however, since the fuel enclosed in the fuel tank 21 is supplied to the electronic control fuel injection apparatus 50 according to the number of revolutions by means of the fuel regulation apparatus 30 making use of air pressure in the crankcase 8, the stability of operation particularly at low speed is improved and a good response to requirement for rapid acceleration and slow down can be obtained, and further, an effect that the output power is improved can be obtained.

While it has been described hereinbefore that the control by the intermittent injection of this example can be applied to an engine 1 for a model mounted to a radio control model air plane, the expression "model" used herein is employed to mean not only a radio control model air plane for a hobby, but also a moving object to which a relatively small-sized engine usually used widely in industries is mounted including model cars, model ships and the like.

According to the controlling apparatus for the engine for the model and the method of controlling therefor of this invention, since an injection of fuel can be carried out intermittently at zone of low speed revolution, stability at low speed revolution (idling) is improved. And, since the fuel flow can be throttled sufficiently at low speed, an excess of fuel (small air/fuel ratio, significantly thick fuel) does not occur and response to quick acceleration is improved. Therefore, rising of the engine is also improved and engine stop occurs scarcely. Further, fuel cost is improved. This invention is applicable also to an engine of high speed revolution achieving 40000 rpm.

What is claimed is:

1. An apparatus for controlling an engine for models, the apparatus comprising:

means for setting an injection period for fuel in accordance with an amount of fuel per cycle required for operating the engine;

means for judging whether the injection period is below a minimum injection period controllable in a fuel injection apparatus of the engine;

means for selecting an intermittent injection data corresponding to said injection period when said injection period is below said minimum injection period; and means for intermittently injecting fuel into said fuel injection apparatus for a controllable injection period at an injection timing based on the selected intermittent injection data.

2. The apparatus of claim 1, wherein the means for selecting said intermittent injection data comprises a data table corresponding said injection period to said intermittent injection data.

3. The apparatus of claim 1, where in the means for selecting said intermittent injection data comprises an equation corresponding said injection period to said intermittent injection data.

4. The apparatus of claim 1, further comprising means for injecting fuel into the fuel injection apparatus for said injection period when said injection period is not below said minimum injection period.

5. The apparatus of claim 1, wherein said controllable injection period is said minimum injection period.

6. The apparatus of claim 1, wherein the intermittent injection data includes a number of revolutions corresponding to one cycle of intermittent injection.

7. A method of controlling an engine for models, the method comprising the steps of:

setting an injection period for fuel in accordance with an amount of fuel per cycle required for operating the engine;

judging whether said injection period is below a minimum injection period controllable in a fuel injection apparatus of the engine;

selecting an intermittent injection data corresponding to said injection period when said injection period is below said minimum injection period; and intermittently injecting fuel into said fuel injection apparatus for a controllable injection period at an injection timing based on the selected intermittent injection data.

8. The method of claim 7, wherein selecting said intermittent injection data is performed based on a data table corresponding said injection period to said intermittent injection data.

9. The method of claim 7, wherein selecting said intermittent injection data is performed based on an equation corresponding said injection period to said intermittent injection data.

10. The method of claim 7, further comprising the step of injecting fuel into said fuel injection apparatus for said injection period when said injection period is not below said minimum injection period.

11. The method of claim 7, wherein said controllable injection period is said minimum injection period.

12. The method of claim 7, wherein said intermittent injection data includes a number of revolutions corresponding to one cycle of intermittent injection. FIGS. 2a–b are cross sections; FIG. 6 is a timing chart for the fuel injection signal of a fuel injection apparatus of a conventional engine for a model.

* * * * *